(12) United States Patent
Bollinger

(10) Patent No.: US 9,365,009 B2
(45) Date of Patent: Jun. 14, 2016

(54) PLATE PRESS SYSTEM AND PROCESS

(71) Applicant: Harvey's Farm Cycle, Inc., Carson City, MI (US)

(72) Inventor: Robert Bollinger, Carson City, MI (US)

(73) Assignee: Harvey Milling Co., Inc., Carson City, MI (US)

( * ) Notice: Subject to any disclaimer, the term of this patent is extended or adjusted under 35 U.S.C. 154(b) by 666 days.

(21) Appl. No.: 13/765,459

(22) Filed: Feb. 12, 2013

(65) Prior Publication Data

US 2014/0224136 A1 Aug. 14, 2014

(51) Int. Cl.
*B30B 9/04* (2006.01)
*B30B 15/00* (2006.01)
*B01D 29/46* (2006.01)
*B30B 9/06* (2006.01)
*B30B 9/26* (2006.01)

(52) U.S. Cl.
CPC . *B30B 9/06* (2013.01); *B01D 29/46* (2013.01); *B30B 9/04* (2013.01); *B30B 9/045* (2013.01); *B30B 9/062* (2013.01); *B30B 9/067* (2013.01); *B30B 9/26* (2013.01); *B30B 9/267* (2013.01)

(58) Field of Classification Search
CPC .......... B30B 9/06; B30B 9/067; B30B 9/262; B30B 15/00; B30B 13/00; B30B 9/04; B30B 9/045; B30B 9/267; B01D 25/12; B01D 25/38; B01D 25/322; B01D 25/172; B01D 25/1645; B01D 25/18; B01D 25/21; B01D 25/215; B01D 29/46
USPC .......... 100/37, 104, 109, 113, 115, 126, 127, 100/128, 129; 210/140, 225, 227, 228, 230, 210/231
See application file for complete search history.

(56) References Cited

U.S. PATENT DOCUMENTS

| | | | | | |
|---|---|---|---|---|---|
| 2,422,895 | A | * | 6/1947 | Habenicht | A23N 1/00 100/127 |
| 2,681,610 | A | * | 6/1954 | Schrock | B04C 3/00 100/147 |
| 3,980,014 | A | * | 9/1976 | McEwen | B30B 9/067 100/112 |
| 4,214,519 | A | * | 7/1980 | Stollenwerk | B30B 9/067 100/127 |
| 4,446,020 | A | * | 5/1984 | Kurita | B01D 25/322 100/112 |
| 4,479,873 | A | * | 10/1984 | Korczykowski | B01D 25/172 100/198 |
| 6,279,471 | B1 | * | 8/2001 | Reddoch | B30B 9/12 100/106 |
| 2010/0307210 | A1 | | 12/2010 | Rosenbaum et al. | |

* cited by examiner

*Primary Examiner* — Jimmy T Nguyen
(74) *Attorney, Agent, or Firm* — Barnes & Thornburg LLP

(57) ABSTRACT

Systems and processes for extracting liquids and solids from waste include separately extracting liquids via spaced plates and solid waste out an exit port with an operably counter-pressured pressure cone. The system and process use a cylinder for accepting waste and a piston for providing pressure and pushing waste through the cylinder. Spaced plates with internal apertures are aligned with the cylinder, and pressure from the piston on waste in the apertures forces liquids to pass between the spaced plates. Solid waste egresses via an exit port aligned with the apertures when pressure on a pressure cone operably connected with the exit port exceeds the force keeping the pressure cone closed on the exit port.

18 Claims, 5 Drawing Sheets

PLATE PRESS SYSTEM AND PROCESS

BACKGROUND

This disclosure relates to systems and processes for extracting liquids and solids from mixtures that contain liquids and solids such as, but not limited to, manure, food processing waste by-products and other substances that require the extraction and separation of liquids from solids. More specifically, the systems and processes include separately extracting liquids via spaced plates as concentrated liquids from such things as animal manure and food processing waste.

Concentrated liquid nutrients are heated by various means resulting in concentrated fertilizer. Solid organic materials are separated, dried and may be disposed of as fuel, used as animal bedding or spread on agricultural fields.

Animal feeding operations (AFO) are constrained by animal manure, animal urine and water contaminated by animal manure, urine and other nutrients if water comes into contact with waste. AFOs must continually dispose of manure and wastewater, which is a difficult, costly and dangerous process due to the presence of methane gas. Wastewater disposition is especially difficult since wastewater nutrients generally exceed State and Federal clean water standards. Wastewater evaporation is too slow of a process for AFOs.

Food processing operations are also constrained by wastewater used in processing activities. Food processors must continually dispose of organic waste and wastewater. Similar to AFOs, wastewater and organic material disposition is difficult for food processors since the wastewater nutrients exceed State and Federal clean water standards. And similar to AFO's, wastewater evaporation is too slow of a process for food processors.

Sand and other granular particles can cause problems with manure and certain food by-products. Sand and similar particles can be very corrosive and wear away metal in screw augers or sand separation equipment, including metal components for such equipment.

DEFINITIONS

In this disclosure, an AFO is defined as an animal feeding operation which stables, confines or concentrates animals. AFOs affected by manure and wastewater disposition issues are primarily, but not limited to, the following agricultural activities: dairy farms, swine farms, veal/beef cattle feeding operations, turkey farms, chicken (broiler) farms, chicken (laying) farms, sheep or lamb farms, and horse farms.

In addition to the aforementioned, any process, where animal manure, urine and/or wastewater are a by-product, is included in this disclosure.

Manure is defined as animal excrement generated by the animal's intestinal system and includes bedding, compost and raw materials or other materials commingled with animal excrement or set aside for disposal. Urine is defined as liquid animal excrement generated by the animal's kidney system. Wastewater is defined as water contaminated by contact with manure, urine and other nutrients, such as during the AFO process.

In this disclosure, a food processor is defined as any operation that transforms whole fruits and vegetables into edible concentrations, such as converting whole apples into applesauce. Food processing waste and wastewater disposition issues are found in a substantial number of food processing activities throughout the country.

SUMMARY

The present disclosure provides a press process and system used to separate mixtures of solid and liquid materials, such as manure, into dried solids and concentrated wastewater. Waste water can be heated by various means resulting in concentrated fertilizer. Solid organic materials can be separated, dried and may be disposed of as fuel, used as animal bedding or spread on agricultural fields.

The disclosure includes flowing a substance, such as manure, into a cylinder which is comprised of a rigid portion and an end or continuing segment that is comprised of a series of plates. Depending on the viscosity of the material, the plates are separated by spacers between the plates. A piston is used to apply pressure to the material in the cylinder. The pressure from the piston squeezes the substance in the cylinder causing the liquid component to flow out of the cylinder through the plates while solid materials remain in the cylinder. A pressure cone at the distal end of the plate section maintains pressure on the solid waste in the cylinder, yet allows the solid materials to escape from the cylinder as additional waste is added to the cylinder and squeezed by the piston.

Liquids that are extracted from the plate press preferably flow to a liquid collecting area for further processing.

Solids that are extracted from the plate press preferably flow to a covered conveyor system where additional heated forced air drying takes place. The solid materials in the conveyor system can be heated to temperatures that will kill bacteria that may be present in the solid material. Upon exiting the conveyor system, the solid material is either held in a collecting area for further processing or may be used as fuel to provide heat to the conveyor drying system.

Sand can be extracted with solids where the combined organics come out the end of the system adjacent to the pressure cone. The sand has less corrosive effect where a vibrator screen can be used to knock sand off to pass through a screen to a collection area.

The plate press system for extracting and separating liquids and solids preferably includes several plate press assemblies aligned on a single crankshaft. The system includes a cylinder for accepting waste and a piston for providing pressure and pushing waste in the cylinder. A plunger of the piston preferably reciprocates within the cylinder to push waste through the cylinder into spaced plates with apertures aligned with the cylinder. Pressure from the piston on waste in the apertures forces liquids to pass between the spaced plates as extracted from the system. An exit port is aligned with the apertures with a counterweighted pressure cone operably connected to the exit port. Pressure from the piston on waste in the cylinder and thus in the apertures can overcome force of the pressure cone to allow solids to egress out the exit port past the pressure cone. A tip of the pressure cone preferably passes through the exit port when connected and rests in some of the apertures of the plates to provide a shape that allows solid waste to pass out the exit port when pressure on the pressure cone is overcome by pressure on the waste from the piston.

BRIEF DESCRIPTION OF THE DRAWINGS

The above mentioned and other features of this disclosure and the manner of obtaining them will become more apparent, and the disclosure itself will be best understood by reference to the following description of systems and processes taken in conjunction with the accompanying figures, which are given as non-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, the figures show, and herein described in detail, embodiments with the understanding that the present descriptions are to be considered exemplifications of the principles of the disclosure and are not intended to be exhaustive or to limit the disclosure to the details of construction and the arrangements of components set forth in the following description or illustrated in the figures.

Figure 1:
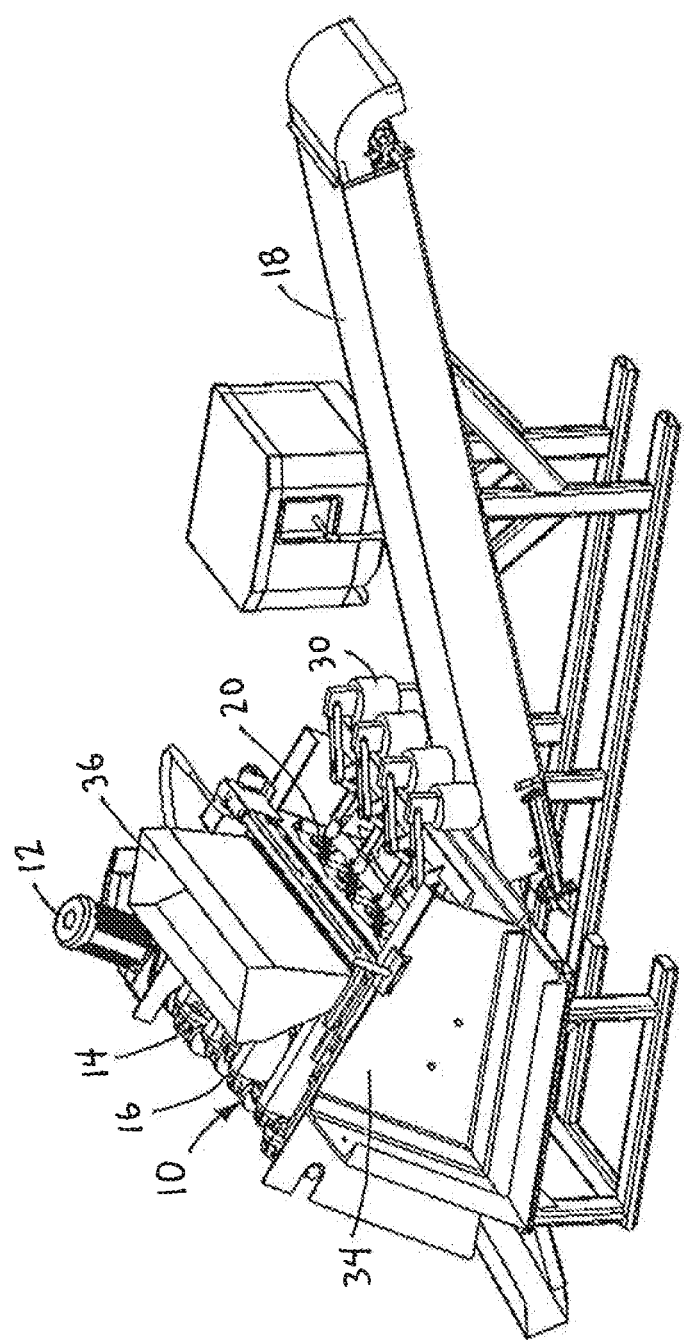
FIG. 1 is a perspective view of a four cylinder plate press system with a conveyor system.
Figure 2:
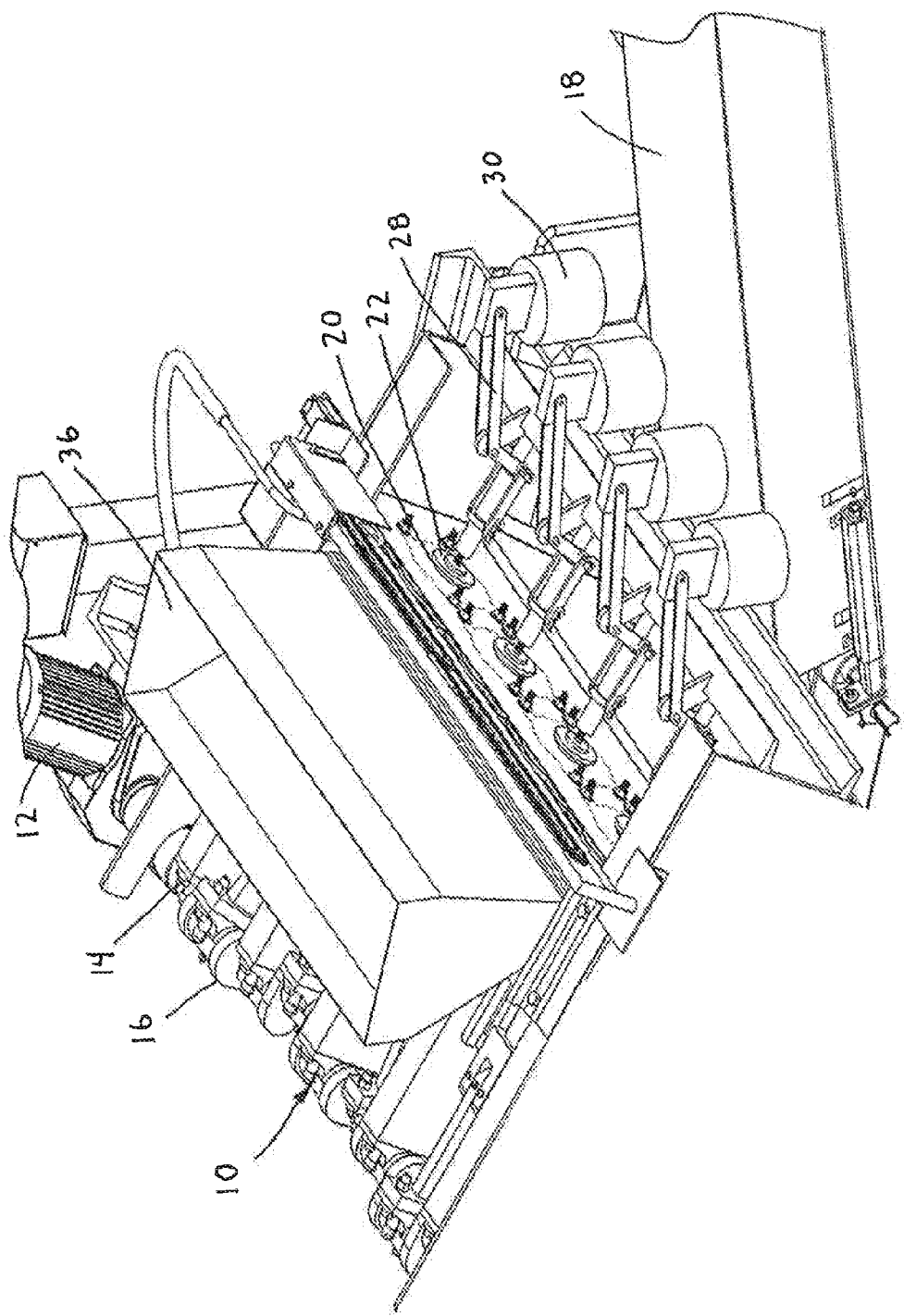
FIG. 2 is a closer perspective view of a four cylinder plate press system focusing on the plate press portion.

FIGS. 1 and 2 show a plate press system 10 as an example four-cylinder plate press system that has been found useful with a single motor 12. As such, each aligned plate press assembly 14 could operate at a quarter turn of a rotating crankshaft 16, but other numbers and arrangements are within the scope of this system. A conveyor system 18, which may be covered and heated as known in the art, can be used to remove substantially solid waste away from the plate press system 10.

Figure 4:
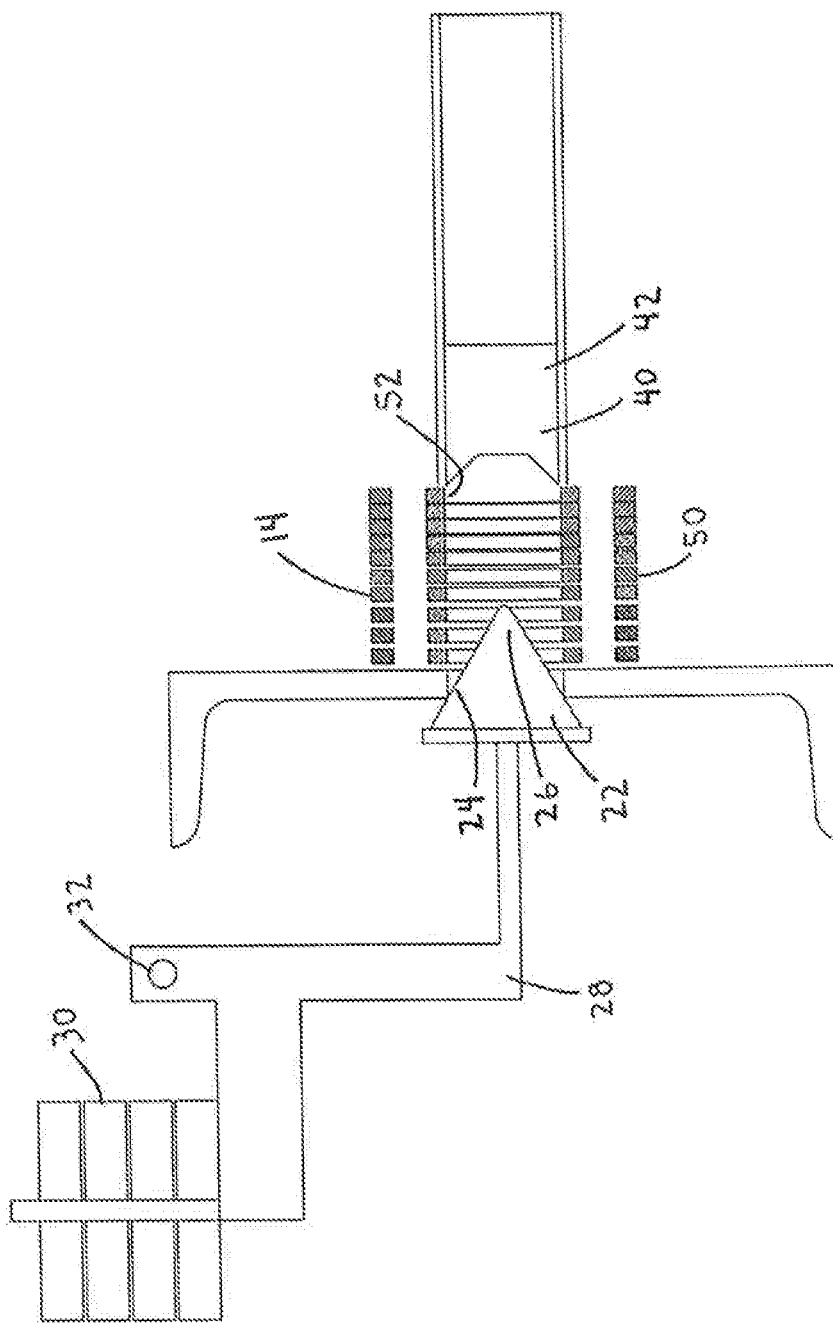
FIG. 4 is a schematic of the plate press assembly with a pressure cone.

At the exit ports 20 for solid waste, a pressure cone 22 controls flow of solid waste adjacent to its sloped sides 24. The tip 26 of the pressure cone 22 preferably passes through the exit port 20. Solid waste passes by the pressure cone 22 when pressure from the plate press system 10 overcomes the resistance of the pressure cone 22, which can pivot on an arm 28 or otherwise resiliently move away from the exit port 20. As shown in FIGS. 1, 2 and 4, a counterbalance 30 or series of pressure weights can provide initial pressure on the pressure cone 22 against the exit port 20. The arm 28 as weighted can function via a hinge point 32 to apply pressure as needed to the pressure cone 22 against the exit port 20. FIG. 4 shows five layers of pressure weights that can be used or removed as needed to adjust the weight and provide appropriate pressure, such as 25 pounds each layer with five layers total. It is contemplated that jugs finable with water can be used for such variable weights to adjust pressure on the pressure cone 22. Similarly, springs or shock absorbers could be used to control acceleration and movement of the pressure cone 22 relative to the exit port 20 to allow substantially solid waste to depart the exit port 20 as pressure from waste in the cylinder 42 exceeds the force of the pressure cone 22 against the exit port 20.

The plate press assembly 14 is built into a frame 34 that includes a receptacle 36 for initially inserting raw waste, such as a trough or chute extending above the frame 34, which connects to a cylinder 38, broadly defined as a passageway, to feed the waste into the plate press assembly 14. The preferred cylinder 38 is used with a pumping and/or pressure means 40, such as a piston 42 with a reciprocating plunger 44, that forces waste under pressure through the cylinder 38. A plunger 44 of a piston 42 can reciprocate within the near side of the cylinder 38 to push waste through the distal end 46 of the cylinder 38 into a series of plates 50.

A series of plates 50 are spaced at the distal end 46 of the cylinder or otherwise in close association with the piston 42 pushing waste toward the series of plates 50. The series of plates 50 each have an aperture 52 preferably in the center, like a doughnut hole, forming the continuing distal end 46 extending from or as part of the cylinder 38 for primary passage of the solid waste. The plates 50 are spaced to allow liquids to flow between the plates 50, with extracted liquids generally being pulled downward by gravity to a collection area below the plates 50.

In the example of FIG. 4, the plate spacing between plates 50 next to the pressure cone 22 is wider. For example, the four plates 50 closest to the pressure cone 22 are spaced 0.135 inch, the next plates 50 are spaced 0.070 inch, the next plates 50 are spaced 0.045 inch and the four plates 50 closest to the piston 42 are spaced 0.030 inch. Also, it is contemplated that the apertures 52 in the plates 50 could get smaller as they get closer to the exit port 20.

The pressure cone 22 blocks the exit port 20 until built up pressure of the waste and pressure from the piston 42 pushes the pressure cone 22 away from the exit port 20 so that substantially solid waste departs the exit port 20 adjacent to the sloped sides 24 of the pressure cone 22. The pressure on the waste from additional waste being pressured from the piston 42 and the resistance of the pressure cone 22 helps squeeze liquids out of the waste to flow out between the plates 50 to a liquid collection area below the series of plates 50.

The series of plates 50 can be adjusted for desired characteristics. For example, the number of plates 50 can be varied. The plate spacing can be adjusted for different viscosities of waste. It is understood that thicker plates can often withstand higher pressure, and for the manure example, a pressure of 15 tons is practical. Enormous pressure can squeeze the waste to achieve desired results of first extracting liquids via the plates 50, then pushing solid waste out the exit port 20.

The type of plates 50 can also be adjusted. For example, plastic plates can be used for applications with sand concerns, wherein sand is partially absorbed or pressed into the plates 50 making a sand surface that interacts with sandy waste materials. The built-up sand surface would not wear out as readily as metal with continuous sand abrasion. While likely too delicate for the example organic waste applications, the plate 50 could be glass for high tolerance delicate processes and for small molecule uses with very close plates, such as for medical applications.

After the substantially solid waste passes past the pressure cone 22, it collects where the preferred conveyor system 18 can move the waste away from the plate press system 10. The substantially solid waste as organics is generally dry enough to burn without activated carbon. Typically, the sand stays with the solids, rather than between the plates 50, through the exit port 20 where sand separation equipments can vibrate sand through a screen or otherwise process the solids to a collector or compost or bedding area as a dried substantially solid waste product.

The liquids collected below the plates 50 may be of high nutrient value, and it may be further processed into a thicker slime. Such slime can be made into quality fertilizer with a pelletizer.

Figure 3:
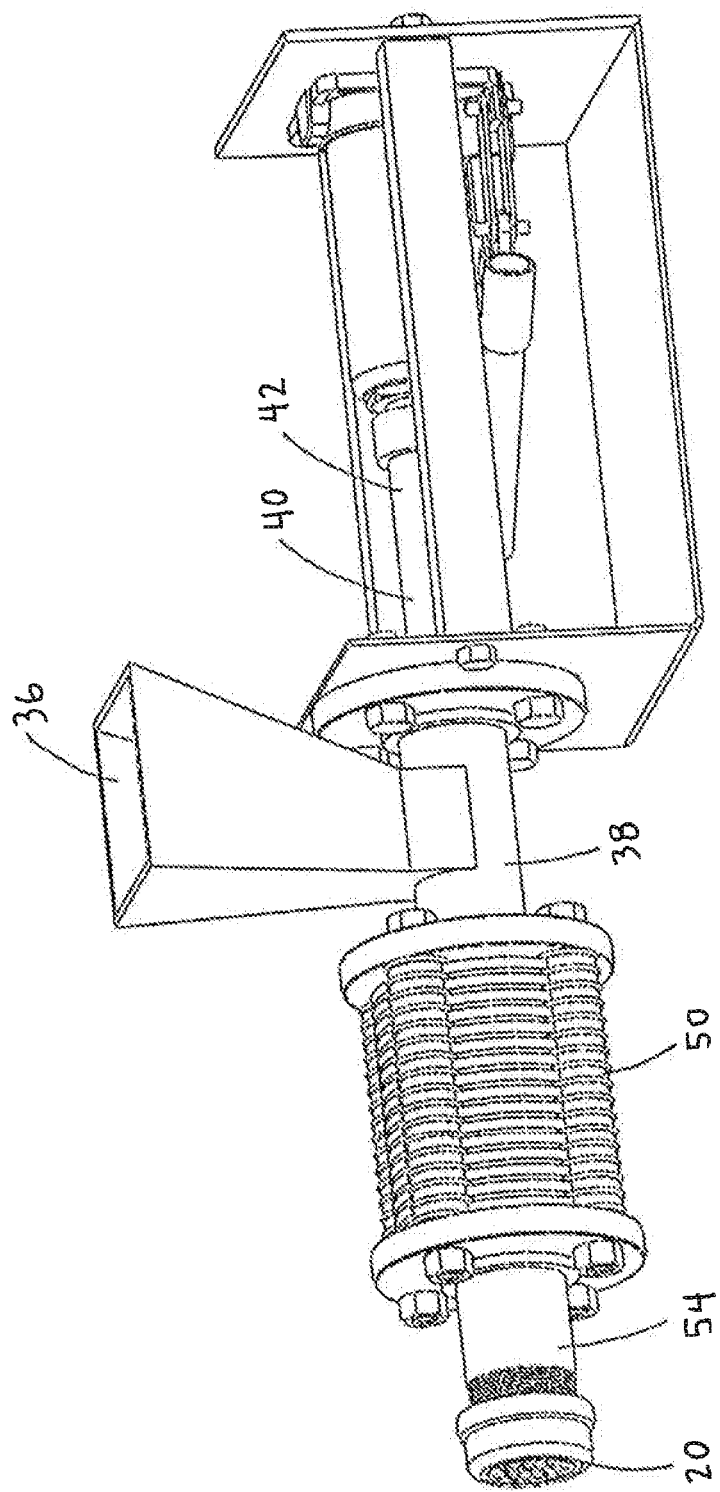
FIG. 3 shows a plate press assembly.
Figure 5:
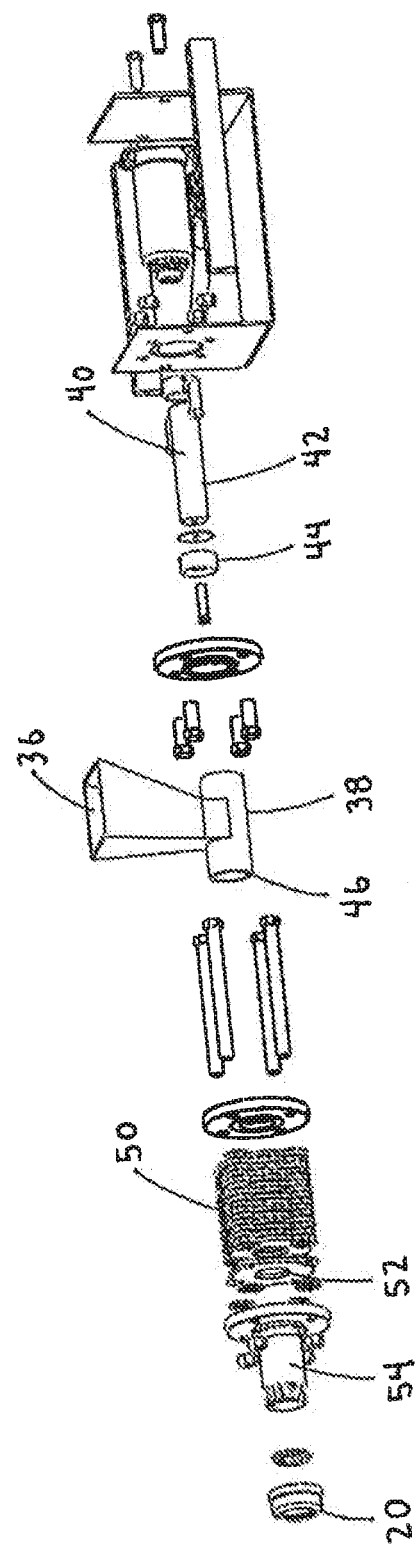
FIG. 5 is an exploded drawing of the plate press assembly components including the pressure piston, the plate press cylinder, liquid extraction plates, and the exit port.

FIG. 3 shows an assembled view and FIG. 5 shows an exploded plate press assembly 14 with the components of the cylinder 38 with the receptacle 36 as a trough extending above, a plunger 44 of a piston 42, the series of plates 50 for liquid extraction, an optional insert 54 that can aligned with the plate apertures 52 and cylinder 38, and an exit port 20.

It is contemplated that some material may jam between the plates 50. Such materials can help filter liquids being extracted, and has not been found problematic if not left to dry out and harden. In a continuous process, any buildup on the plates 50 or between the plates 50 has not raised undue difficulties. At shut-down, however, the plates 50 are preferably cleaned. Thus, a high pressure water spray device or a knife system to clean between the plates 50 would be preferred complementary systems with the plate press system 10.

The disclosed processes allow for separate extraction of solids and concentrated liquid nutrients from animal manure and food processing waste as the preferred examples.

Process for Extracting Liquids from Solids

Per FIGS. 1-5, waste by-products are separated into solids and liquids by the mechanical plate press system 10.

The liquid material extract can be directed over a heated, hooded or covered trough. As the liquids move through the trough, it is heated to its boiling point. Dried organic solids, from the plate press system 10, can be used as a source of energy to produce heat. As the liquid boils, water evaporates into steam, which can be collected inside the hood and allowed to runoff or be captured as distilled water. The residual wastewater becomes a concentrated slim material rich in nutrients for use as concentrated fertilizer.

As can be derived from FIGS. 1-4, the operational flow of the plate press system 10 for the treatment of waste, such as manure, can be as follows:

Step 1. Waste is pumped or inserted to the top of the plate press system 10, such as via a receptacle 36, where it enters the cylinder 38.

Step 2. A piston 42, such as connected to a crankshaft 16, moves the waste into the cylinder 38 where it is compressed.

Step 3. The compressed waste is forced into the section of plates 50 of the plate press assembly 14.

Step 4. The pressure from the piston 42 causes liquids in the waste to seep through the plates 50 of the plate press assembly 14. The liquids can be collected in a holding area, such as below the plates 50, for further processing.

Step 5. The pressure from the piston 42 causes the waste solids to seep past the pressure cone 22 and collect in the solids collecting area for further processing.

For manure or food as the waste, step 6 may include moving extracted liquids through a heated trough where liquid is allowed to evaporate leaving a concentrated slim fertilizer material.

For manure or food processing by-products as the waste, step 7 may include organic waste solid materials moved through or over a heated, covered or hooded conveyor system 18 where the solids are dried by forced air. During this process, temperatures can reach more than 160 degrees Fahrenheit, which kills bacteria in the solids. The dried organic solid material is available for animal bedding or returned to fields.

Organic solid material can be stacked in a compost pile and allowed to compost at temperatures more than 160 degrees Fahrenheit to kill bacteria and weed seeds. Composted materials are available for animal bedding or returned to fields.

The process and subsequent treatment, processing or use of extracted solids and liquids is meant to be a continuous process where continuing waste is pressed through the cylinder 38 and plates 50.

The plate press process is not limited to waste or specifically manure as disclosed herein. It can be utilized for any organic material that requires separation of liquids and solids.

The separate extraction of liquids via the plates 50 typically allows organics to be dry enough to burn or further process, including sand removal.

This disclosure has been described as having exemplary processes and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such departures from the present disclosure as come within the known or customary practice within the art to which it pertains.

What is claimed is:

1. A system for extracting and separating liquids and solids from waste that contains liquids and solids comprising:
    a cylinder for accepting waste;
    a piston for providing pressure and pushing waste in the cylinder;
    spaced plates with apertures aligned with the cylinder, wherein pressure from the piston on waste in the apertures forces liquids to pass between the spaced plates;
    an exit port aligned with the apertures; and
    a pressure cone operably connected with the exit port, wherein pressure from the piston on waste in the cylinder and in the apertures overcomes force of the pressure cone to allow solids to egress out the exit port past the pressure cone,
    wherein the cylinder, piston spaced plates, exit port and pressure cone together comprise an aligned plate press assembly, and further including four aligned plate press assemblies that operate at a quarter turn of a rotating crankshaft.

2. The system of claim 1 wherein a tip of the pressure cone passes through the exit port and can be partially inside the apertures of the spaced plates.

3. The system of claim 1 wherein adjustable counterbalance weights provide initial pressure on the pressure cone against the exit port.

4. The system of claim 1 wherein a plunger of the piston reciprocates within the cylinder to push continuing waste through the cylinder into the apertures of the spaced plates.

5. A system for extracting and separating liquids and solids from waste that contains liquids and solids comprising:
    a cylinder for accepting waste;
    a piston for providing pressure and pushing waste in the cylinder;
    spaced plates with apertures aligned with the cylinder, wherein pressure from the piston on waste in the apertures forces liquids to pass between the spaced plates;
    an exit port aligned with the apertures; and
    a pressure cone operably connected with the exit port, wherein pressure from the piston on waste in the cylinder and in the apertures overcomes force of the pressure cone to allow solids to egress out the exit port past the pressure cone, wherein plate spacing between the spaced plates adjacent to the pressure cone is wider than spacing of the spaced plates closest to the piston.

6. A system for extracting and separating liquids and solids from waste that contains liquids and solids comprising:
    a cylinder for accepting waste;
    a piston for providing pressure and pushing waste in the cylinder;
    spaced plates with apertures aliened with the cylinder, wherein pressure from the piston on waste in the apertures forces liquids to pass between the spaced plates;
    an exit port aligned with the apertures; and a pressure cone operably connected with the exit port, wherein pressure from the piston on waste in the cylinder and in the apertures overcomes force of the pressure cone to allow solids to egress out the exit port past the pressure cone, wherein the spaced plates are made of plastic wherein sand can be partially absorbed or pressed into the spaced plates.

7. The system of claim 1 wherein the apertures of the spaced plates are aligned between the cylinder and the exit port.

8. The system of claim 1 wherein the pressure cone is a counterweighted pressure cone operably connected with the exit port with a tip of the pressure cone passing through the exit port when connected, wherein pressure from the piston on waste in the cylinder and in the apertures overcomes force of the pressure cone to allow solids to egress out the exit port past the pressure cone.

9. The system of claim 5 wherein a tip of the pressure cone passes through the exit port and can be partially inside the apertures of the spaced plates.

10. The system of claim 9 wherein the pressure cone is a counterweighted pressure cone, and wherein pressure from the piston on waste in the cylinder and in the apertures overcomes force of the pressure cone to allow solids to egress out the exit port past the pressure cone.

11. The system of claim 5 wherein adjustable counterbalance weights provide initial pressure on the pressure cone against the exit port.

12. The system of claim 5 wherein a plunger of the piston reciprocates within the cylinder to push continuing waste through the cylinder into the apertures of the spaced plates.

13. The system of claim 5 wherein the apertures of the spaced plates are aligned between the cylinder and the exit port.

14. The system of claim 6 wherein a tip of the pressure cone passes through the exit port and can be partially inside the apertures of the spaced plates.

15. The system of claim 14 wherein the pressure cone is a counterweighted pressure cone, and wherein pressure from the piston on waste in the cylinder and in the apertures overcomes force of the pressure cone to allow solids to egress out the exit port past the pressure cone.

16. The system of claim 6 wherein adjustable counterbalance weights provide initial pressure on the pressure cone against the exit port.

17. The system of claim 6 wherein a plunger of the piston reciprocates within the cylinder to push continuing waste through the cylinder into the apertures of the spaced plates.

18. The system of claim 6 wherein the apertures of the spaced plates are aligned between the cylinder and the exit port.

* * * * *